Figure 4:
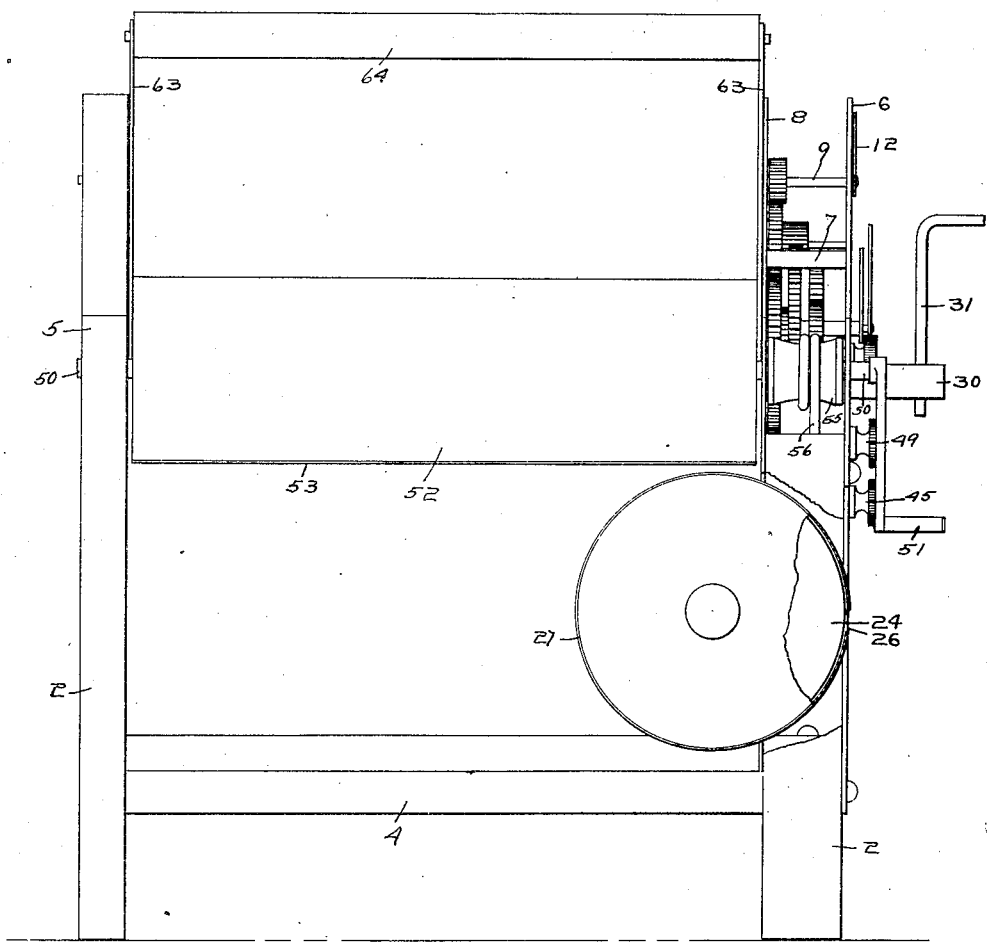

J. F. McADAMS.
MEASURING AND INVOICING MACHINE.
APPLICATION FILED SEPT. 7, 1911.
1,045,420.
Patented Nov. 26, 1912.
5 SHEETS—SHEET 1.
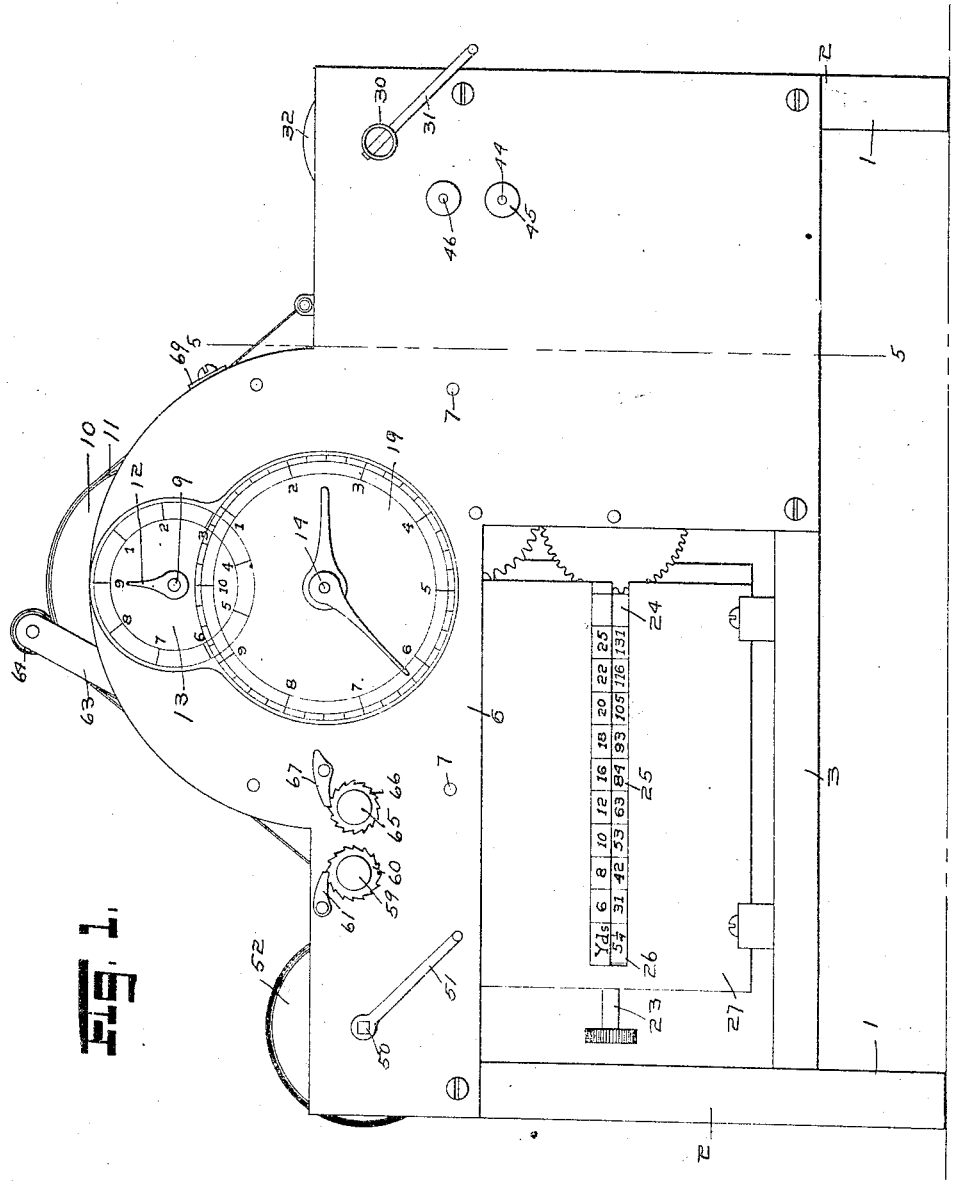
Witnesses
Inventor
J. F. McAdams
By
Attorneys

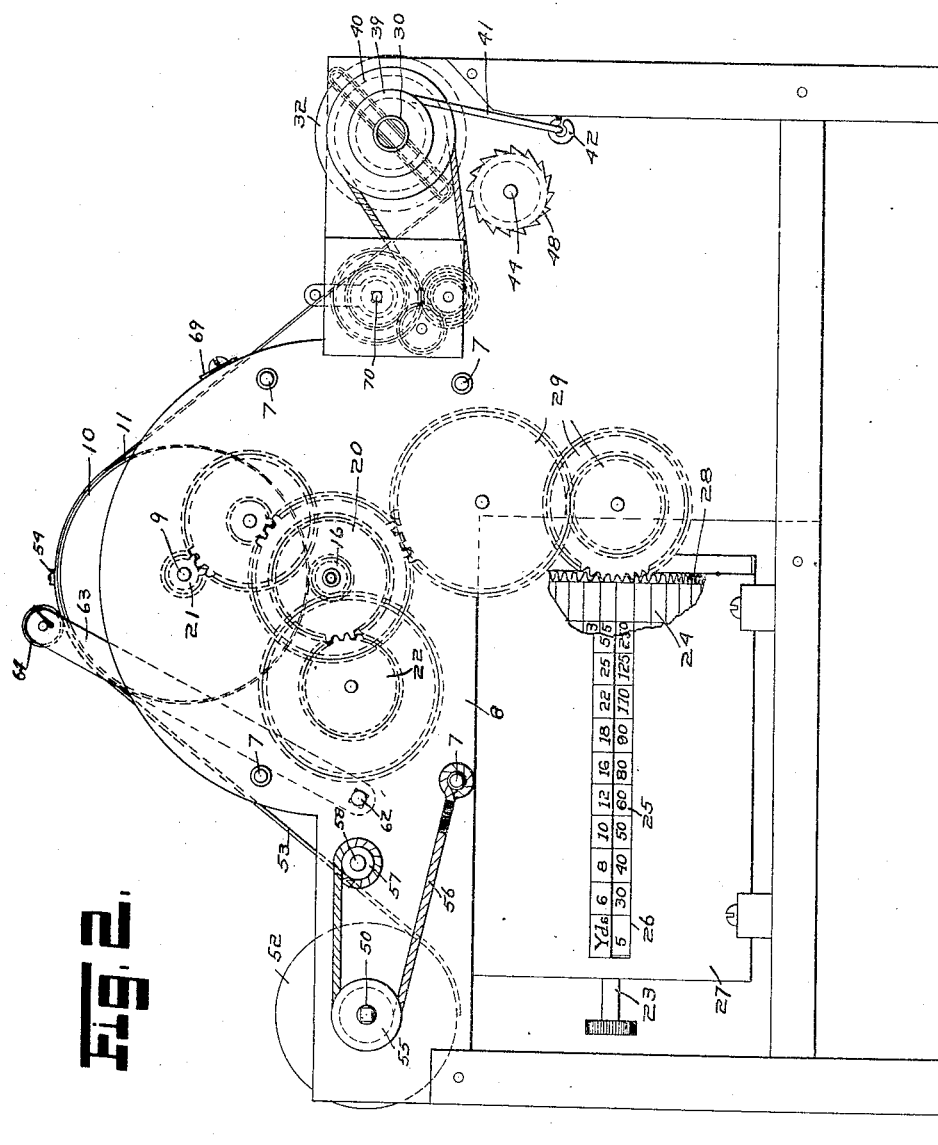

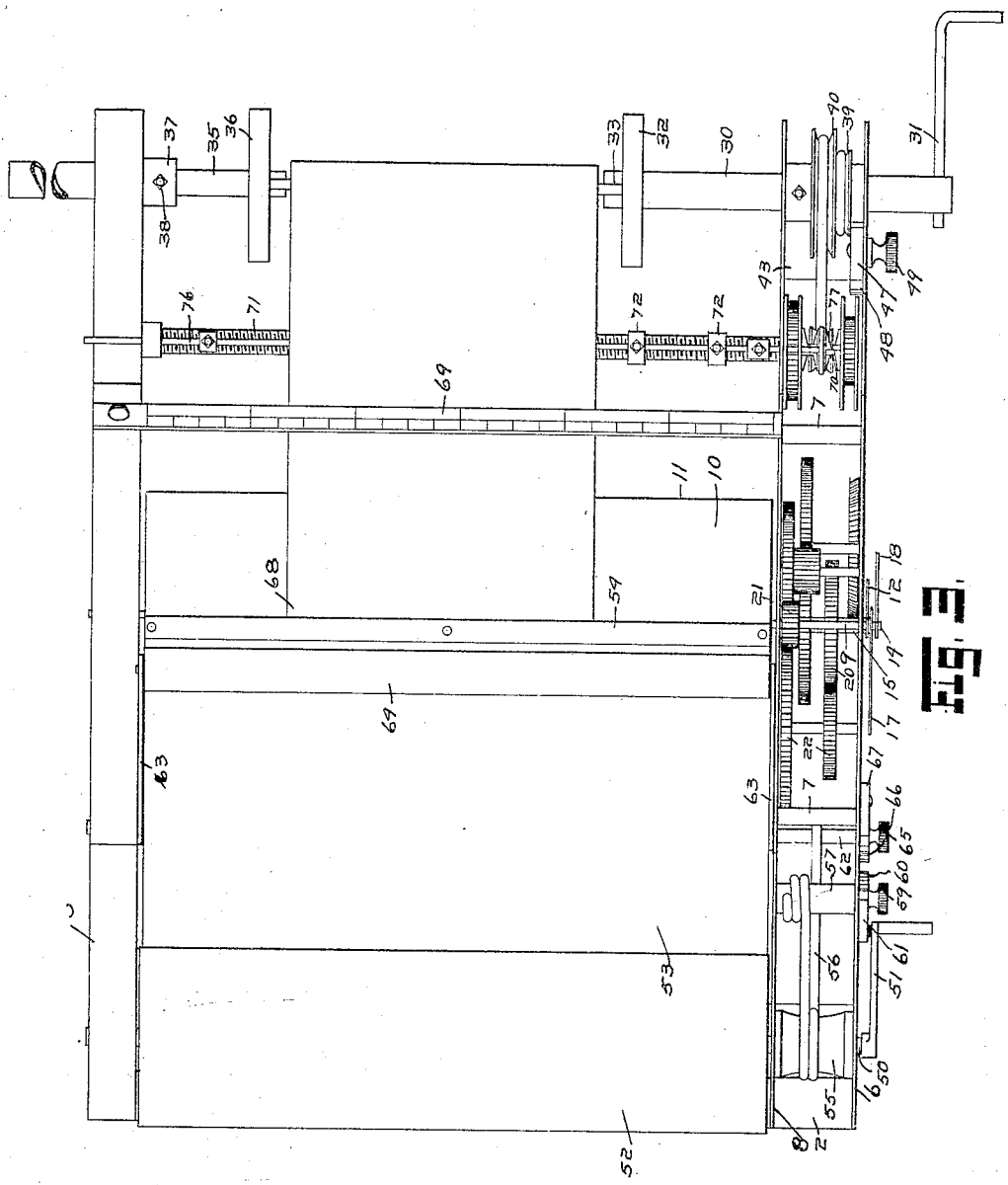

J. F. McADAMS.
MEASURING AND INVOICING MACHINE.
APPLICATION FILED SEPT. 7, 1911.

1,045,420.

Patented Nov. 26, 1912.
5 SHEETS—SHEET 4.

Witnesses

Inventor
J. F. McAdams
By
Attorneys

J. F. McADAMS.
MEASURING AND INVOICING MACHINE.
APPLICATION FILED SEPT. 7, 1911.
1,045,420.
Patented Nov. 26, 1912.
5 SHEETS—SHEET 5.
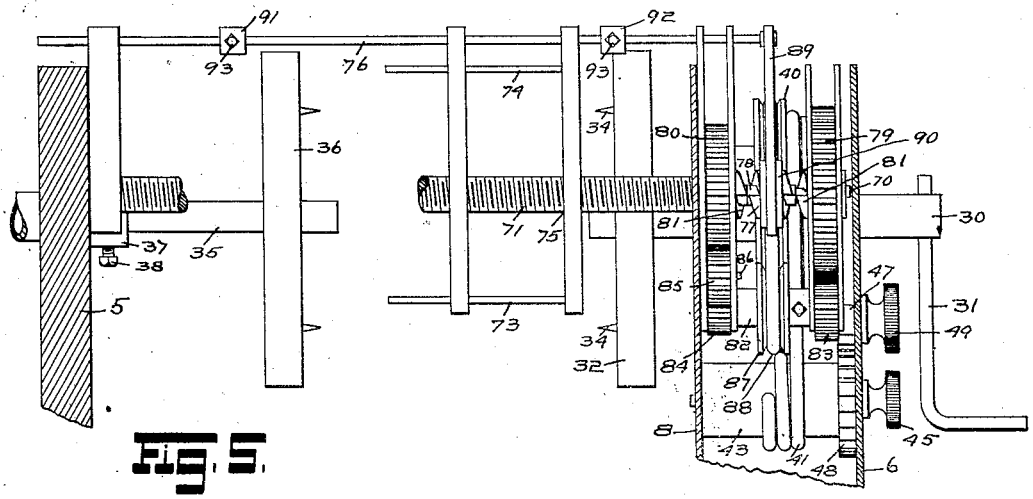
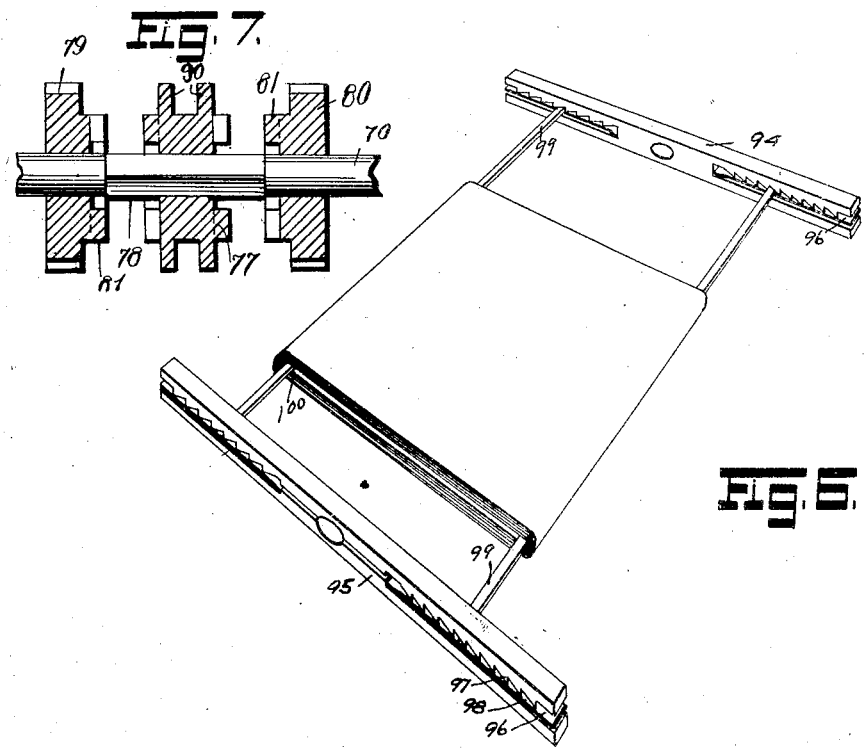
Witnesses
Inventor
J. F. McAdams
By
Attorneys

UNITED STATES PATENT OFFICE.

JAMES F. McADAMS, OF LIMA, ILLINOIS.

MEASURING AND INVOICING MACHINE.

1,045,420.　　Specification of Letters Patent.　　Patented Nov. 26, 1912.

Application filed September 7, 1911. Serial No. 648,097.

*To all whom it may concern:*

Be it known that I, JAMES F. MCADAMS, a citizen of the United States, residing at Lima, in the county of Adams, State of Illinois, have invented certain new and useful Improvements in Measuring and Invoicing Machines; and I do hereby declare the following to be a full, clear, and exact description of the invention, such as will enable others skilled in the art to which it appertains to make and use the same.

My invention relates to new and useful improvements in cloth measuring and invoicing machines, and the object of my invention is to improve the construction and increase the efficiency of machines of the above described type.

A further object of my invention is to provide a machine having a measuring roll over which the cloth or other goods to be measured is passed under tension thereby turning the roll to register the length of cloth passed over the same said registering mechanism being also adapted to actuate a cylinder upon the peripheral face of which is inscribed a scale from which the value of the goods measured may be read.

A further object of my invention is to provide a machine of the character described having a measuring roll over which the cloth is passed and having at one end a clamp appliance adapted to receive the board upon which the bolt of cloth is wound, said clamping appliance being arranged to rotate and thus permit the unwinding of the bolt, and having at its opposite end a roll adapted to receive the cloth as it comes from the bolt, said latter receiving roll being provided with a clamp for engaging the end of the cloth.

A still further object of my invention is to provide means for revolving the bolt receiving member in such a manner that the cloth when being measured may be unwound from the receiving roll and again wound up upon the board, and in connection with this mechanism a further object of my invention is to provide tensioning means for limiting the ease of rotation of the receiving roll whereby the cloth may be evenly and tightly wound upon the board.

A further object of my invention is the provision of a mechanism adapted to be employed when measuring lace and the like in insuring the even winding of the lace upon its board or spool after being measured, said device consisting of a carriage mounted to reciprocate transversely to the line of travel of the lace to cause the same to be wound evenly from one end of the spool to the other, the lace being passed through a suitable guide in the carriage which is caused to reciprocate by means of suitable gears actuated by the turning of the board holding mechanism. And a still further object of my invention is the provision of a novel form of adjustable reel adapted to be employed either for unwinding or winding cloth or fabrics which are not wound upon board, said means being adapted for detachable connection to the board clamping mechanism.

With these and other objects in view, my invention will be more fully described, illustrated in the accompanying drawings which show a preferred embodiment of my machine, and then specifically pointed out in the claims which are attached to and form a part of my application.

In the drawings, Figure 1 is a front elevation of my improved measuring machine. Fig. 2 is a similar view, the front wall being removed to show the operating mechanism. Fig. 3 is a top plan view. Fig. 4 is an end elevation. Fig. 5 is a transverse section on the line 5—5 of Fig. 1 showing the reel actuating mechanism. Fig. 6 is a perspective of one form of reel used. Fig. 7 is a detail view of a part of the guide mechanism.

Referring more specifically to the drawings, in which similar reference numerals designate corresponding parts throughout, 1 designates in general the supporting frame which may be constructed of wood or metal as preferred and which consists of a plurality of leg members 2 secured together in proper position by means of longitudinal braces 3 and transversely extending braces 4 and secured to the upper ends of two of these legs is a back member 5 while secured to the two opposite legs is a front member 6 while secured to this front member and in parallel spaced relation thereto by means of spacer studs 7 is a wall member 8 which together with the front member form a casing for the driving mechanism of the various parts of the machine proper.

Extending transversely between the central portion of the front and rear walls and journaled therein is a shaft 9 upon which is keyed the measuring roll 10 which roll is preferably one foot or a fraction or a multiple thereof in circumference in order that one revolution of the roll by the passage of the cloth will represent a known part of a linear measure. This measuring roll is preferably covered with felt or other fabric 11 having a comparatively heavy nap which prevents the cloth from slipping over the same. One end of the shaft 9 extends through the front 6 of the frame and is provided with an indicating hand 12 which moves over a dial 13 thereby registering the angle through which the roll is turned. Directly below this shaft 9 and journaled in the front of the frame 6 and in the wall 8 is a shaft 14 and rotatable upon this shaft is a sleeve 15. One end of this sleeve bears against a gear 16 carried by the shaft 14 intermediate between the front 6 and the wall 8 while the other end extends through the front member 6 and is provided with an indicating hand 17. The outer end of the shaft 14 extends a slight distance beyond the outer end of the sleeve 15 and is provided with a third indicating hand 18, both of these latter indicating hands being adapted to turn over a second dial 19. Keyed upon that portion of the sleeve which lies between the front of the frame and the wall 8 is a gear 20 and keyed upon that portion of the shaft 9 lying within the casing is a gear 21, while a train of reducing gears indicated as a whole by the numeral 22 coacts between the gear 21 and the gears 16 and 20 causing the latter to turn as the roller turns, said gears being so proportioned that the needle carried by the shaft 14 will make one complete rotation for each ten rotations of the measuring drum while that carried by the sleeve will make one rotation for each hundred rotations of the drum. It will thus be seen that the number of turns made by the drum during the passage of a certain piece of cloth thereover may be readily read on the latter mentioned dial while any fractional rotation thereon may be read upon the first mentioned dial.

Journaled in suitable bearings carried by the frame and extending longitudinally thereof is a shaft 23 upon which is keyed a drum 24 upon the peripheral face of which is inscribed or otherwise marked a table 25 a portion of which is visible through a slot 26 formed in the drum casing 27. As shown the figure at the left of this table in each case indicates the number of yards measured while the remainder of the figures displayed through the slot indicate the value at various prices of that number of yards, a scale of prices being carried by the drum casing immediately above its slot. In computing with this table a person employing the machine need only look at the number shown through the slot directly below the number upon the casing scale indicating the price per yard of the goods measured. As a means for actuating this drum to cause it to turn in such a manner that the left hand member shown through the slot shall always indicate the number of yards measured I have provided the gear 28 which is secured to one end of the drum and a train of reducing gears designated as a whole by the numeral 29 which co-act between the gear 28 of the drum and one of the gears of the train 22.

The above described mechanism deals wholly with the measuring, registering and computing mechanism of the machine and as will be readily understood is actuated wholly by the cloth passing over the measuring drum. I will now describe the mechanism by means of which the cloth is passed over the drum and by means of which the cloth when measured is rewound.

Rotatably mounted in bearings carried by the front 6 and the wall 8 of the casing is a shaft 30 which is preferably tubular in form and which is positioned with one of its ends extending in front of the wall 6 and one back of the wall 8 and secured upon the outer end is a hand crank 31 while secured adjacent the inner end is a disk 32. As shown the inner end of this shaft or tube is cut away at diametrically opposite points to form a slot 33 adapted to receive one end of the board upon which the bolt of cloth is wound and the inner face of the disk is provided with outwardly projecting, oppositely positioned prongs 34 adapted to be inserted in the end of the board and thus assist in holding the same against rotation independent of the shaft 30. Extending through the back 5 of the frame at a point directly opposite the shaft 30 is a second and similar shaft 35, said shaft being rotatably journaled in tubular bearings carried by the back wall 5. The inner end of this shaft is also slotted and provided with a second disk 36 also having prongs said slotted end and prongs being adapted to engage the opposite end of the cloth carrying board. Slidably mounted upon the shaft 35 is a collar 37 provided with a set screw 38 by means of which the collar may be secured at any desired position upon the shaft and it will thus be seen that by loosening the collar the shaft 35 may be moved through its bearings longitudinally to permit of the positioning of the cloth bearing board and when said board has been clamped in place the collar may be positioned to bear against the inner end of the sleeve through which the shaft 35 passes and then secured in place by means of the set screw thus firmly securing the bolt of cloth in position.

Keyed or otherwise secured upon that portion of the shaft 30 between the front wall 6 and the wall 8 of the casing are the pulleys 39 and 40 and a cord 41 is passed over the pulley 39 and is secured by one end to a pin 42 which extends transversely between the walls 6 and 8 while its other end is secured to a small winding drum 43 keyed upon a shaft 44 one end of which extends through the front wall 6 and is provided with a hand nut 45 by means of which the shaft together with its drum may be revolved to wind up the cord and thus exert tension upon the pulley 39 to prevent too free rotation of the shaft 30. As a means for securing this tensioning device in adjusted position I have provided a shaft 46 having a pawl 47 adapted to engage with teeth of a gear 48 carried by the shaft 44, said shaft 46 also extending through the front wall 6 and being provided with a hand nut 49 by means of which the shaft may be turned to move the pawl in and out of operative position.

As a means for winding the cloth as it comes from the measuring drum I have provided the opposite end of the machine with a transversely extending shaft 50 which is suitably journaled in the front and back walls 5 and 6 and in the casing wall 8 and one end of this shaft extends through the front wall 6 and is provided with a hand crank 51. Keyed upon this shaft and in alinement with the measuring drum is a drum 52 adapted to receive the cloth as it comes from the measuring drum. Secured by one end to this drum 52 is a piece of felt or other fabric 53 similar to that upon the measuring roll and this felt is wound about the drum 52 and is provided at its free end with clamping jaws 54 adapted to engage the end of the cloth to be measured, said strip of felt being of sufficient length to extend to the top of the measuring roll when partially unwound whereby the entire amount of cloth passing over the roll is measured. Keyed upon that portion of the shaft 50 lying between the walls 6 and 8 of the casing is a grooved pulley 55 and a cord 56 is passed around this pulley and secured by one end to one of the spacer studs 7 while its opposite end is secured to a drum 57 carried by a shaft 58, one end of which extends in advance of the front wall 6 and is provided with a hand nut 59 and a ratchet wheel 60 and coacting with this ratchet wheel and carried by the front wall 6 is a pawl 61, said latter mechanism serving to tension the winding drum and to prevent it from turning too freely, this being particularly useful when the fabric is unwound from the winding drum 52.

As a means for additionally insuring the turning of the measuring roll by the passage of the cloth thereover I have provided a device adapted to force the cloth down upon the measuring roll, said device consisting of a shaft 62 journaled in the walls of the frame and provided with upwardly extending arms 63 between the free ends of which is rotatably mounted a roller 64 also covered with felt and adapted to bear upon the upper face of the measuring roll. One end of this shaft 62 extends in advance of the front wall 6 and is provided with a hand nut 65 by means of which the shaft may be turned to cause the roller 64 to exert greater or less pressure upon the cloth as desired, and with a ratchet wheel 66 adapted to coact with a pawl 67 pivoted upon the wall 6 whereby the roller may be secured in adjusted position.

In operation the bolt of fabric to be measured is positioned between the board holding shafts 30 and 35 and the free end of the fabric which is represented generally at 68 is passed over the roller 64 and engaged by the clamp jaws 54 of the felt 53 carried by the winding drum when the winding drum is rotated by means of the hand crank 51 to unwind the fabric from its bolt and wind it upon the winding drum 52. When so wound the free end of the fabric is passed over the measuring roll 10, beneath the roller 64 and beneath a transversely extending scale 69 adapted to measure the width thereof and secured to the board which is then rotated in reverse direction, the fabric being thus rewound upon the board while at the same time its passage over the measuring roll actuates the latter to register its length.

In measuring laces or narrow fabrics which are wound upon spools or boards much greater in length than the width of the fabric it is necessary that the fabric as it comes from the measuring roll be so directed and guided as to cause it to be evenly wound upon the spool or board throughout the length of the latter. As a means for accomplishing this I have provided a transversely extending shaft 70 journaled in suitable bearings carried by the same and as shown this shaft is provided throughout a greater portion of its length with helical threads 71. A carriage consisting of a pair of spaced apart side members 72 connected at their lower ends by a rod 73 and at a point adjacent their upper ends by a second rod 74 is adapted to be reciprocatingly mounted upon this shaft by means of threaded bores 75 formed one in each of the side members and intermediate their length and through which the shaft 70 is passed, the threads of the shaft coacting with the threads of said bores. Slidably mounted in suitable bearings carried by the frame and at a point directly above the shaft 70 is a transversely extending guide rod 76, said rod passing through suitable apertures formed in the upper ends of the side members 72 of the carriage. From the foregoing description it will be seen that the revolving of the shaft 70 in one direction will cause the carriage to move toward the rear side of the frame while the revolving of the shaft in the opposite direction will cause a countermovement of the carriage, the guide rod 76 at all times serving to prevent the carriage from rotating with the shaft. As a means for actuating this shaft 70 I have provided a double faced cylindrical clutch member 77 which is slidably mounted while at the same time held against rotation upon that squared portion 78 of the shaft 70 which lies between the walls of the casing and rotatably mounted upon this shaft 70 and free to run idly thereon are gears 79 and 80 which are positioned one upon either side of the clutch member and each of which is provided with a clutch face 81 adapted to engage with one of the clutch faces of the clutch member 77. A shaft 82 is journaled between the walls 6 and 8 of the casing and keyed upon this shaft is a gear 83 which meshes with the gear 79 and a second gear 84 which meshes with a gear 85 carried by a stub shaft 86, said gear 85 meshing with the gear 80. Between the gears 83 and 84 and upon the shaft 82 is keyed a pulley 87 and a belt 88 is passed over this pulley 87 and the pulley 40 carried by the shaft 39. It will thus be seen that when the shafts 30 and 35 are revolved to wind up the fabric the motion of the shaft 30 will be transmitted to cause the gears 79 and 80 to revolve in opposite directions and therefore the shaft 70 may be revolved in either direction, said direction being determined by the engagement of the clutch 77 with either of the gears 79 and 80. As a means for operating this clutch to cause the carriage to automatically reciprocate transversely of the frame I have provided one end of the guide rod 76 with a downwardly extending bifurcated arm 89 the terminals of which are positioned one upon either side of a centrally located peripheral flange 90 formed integrally with the clutch mechanism 77, while the guide rod is also provided intermediate its length with spaced apart collars 91 and 92 which may be secured in adjusted position upon the rod by means of set screws 93, the carriage being positioned to travel between said collars. As will be readily seen the carriage in its movement transversely across the frame will engage against one of these collars thereby sliding the rod 76 longitudinally through its bearings and so reversing the clutch 77 thus causing the shaft 70 to revolve in the opposite direction and so reverse the movement of the carriage. When this guiding carriage is to be employed the end of the lace or other fabric to be wound is passed over the measuring roll and beneath the scale in the customary manner and is then passed beneath the rod 74 which joins the upper portion of the carriage and hence to the spool or board.

In many cases the cloth to be measured instead of being wound upon boards is merely wound upon itself and in order to adapt my machine for use in measuring such cloth I have provided a take-down reel adapted to be employed with cloth so wound and adjustable for various sizes of rolls. This reel consists of side members 94 and 95 which may be formed of wood or metal as preferred and which are identical in construction, each consisting of a rectangular shaped body member having a centrally positioned bore adapted to be positioned over the slotted end of one of the shafts 30—35 and having its end portions bifurcated as at 96. Secured along the inner face of one of the bifurcated arms at each end of these members is a rack plate 97 while secured to the inner face of the opposite arm is a spring 98 which in normal position bears against the opposite arm and at a point adjacent the rack plate. Coacting with these side members are a pair of resilient metal bars 99 which are adapted to be positioned with their ends between the bifurcated arms of the side members to form a skeleton reel, said ends being held in position by the coaction of the teeth of the rack plates and the springs. As will be readily seen these bars may be positioned at any point between the central portion of the side members and the ends thereof whereby the reel may be adapted for various sizes of rolls. In employing this improved reel these bars 99 are inserted between the inner layers of the fabric as shown at 100 and the side members are then positioned upon the ends of the bars whereby the reel is formed within the cloth as already wound. This reel together with its cloth is positioned upon the inner ends of the shafts 30—35 as previously described when the cloth may be readily unwound. When the cloth has been again wound upon this reel the reel is removed from the machine, the sides of the reel are detached from the bars 99 and the bars are then drawn out from between the folds of the cloth, thus leaving the cloth wound in its original manner.

As the operation of the machine and the various parts thereof has been fully described in connection with the description of the parts no further description of the operation is necessary.

As will be readily apparent from the foregoing description taken in connection with the drawings I have provided a cloth measuring and invoicing machine which measures the cloth passed through the machine, registering the amount of cloth so measured and displaying the value thereof. It will also be seen that I have provided a machine of the character described which is applicable equally as well to fabrics wound upon boards, fabrics wound upon themselves, and also to laces, ribbons and the like which must be wound evenly from one end to the other of the board or spool containing the same.

What I claim is:—

1. A machine of the class described, including a frame, a measuring roll rotatable in said frame, a winding roll rotatable in said frame, means for engaging a board upon which the cloth to be measured is to be wound, said means also being rotatable in the frame, and means for guiding the cloth as it passes to the board, said means comprising a threaded shaft rotatably mounted in the frame, a carriage through which the cloth is adapted to be passed mounted upon said shaft and adapted to be reciprocated by its threads, oppositely disposed clutches rotatable upon said shaft, a double clutch member slidable on said shaft and adapted to engage with either of said clutches, means for automatically throwing said double clutch from engagement with one of said clutches to engagement with the other, means for actuating said cloth board engaging means and means actuated by said latter means for rotating said clutches in opposite direction.

2. A machine of the class described, comprising a frame a measuring roll rotatably mounted in said frame, a cloth roll carrying means rotatably mounted in said frame, a shaft rotatably journaled in said frame, a winding drum keyed to said shaft, means for rotating said shaft, and means for tensioning said rotating means, said means consisting of a grooved pulley keyed upon said shaft, a second shaft rotatably mounted in the frame, a pulley mounted on said second shaft, a cord attached by one end to said latter pulley, said cord being passed over the first mentioned pulley and secured by its free end to the frame, means for turning said second shaft to exert tension on said cord, and means for holding said second shaft against counter-rotation.

3. A machine of the class described, including a frame, a measuring roll rotatable in said frame, a winding roll rotatable in said frame, means for engaging a board upon which the cloth to be measured is to be wound, said means also being rotatable in the frame, means for rotating said board, and means for guiding the cloth as it passes to the board, said means comprising a shaft rotatably mounted in the frame, a carriage mounted for reciprocation upon said shaft, and means operated by the bolt rotating means for automatically reciprocating said carriage upon the shaft.

In testimony whereof, I affix my signature, in presence of two witnesses.

JAMES F. McADAMS.

Witnesses:
O. P. SPENCER,
BERTHA VINSON.